Jan. 2, 1968          J. L. GOLDMAN          3,361,274

LIGHTER LIFTING AND STACKING DEVICES

Filed April 4, 1966          6 Sheets-Sheet 2

INVENTOR
Jerome L. Goldman

BY Wilkinson, Mawhinney & Theibault
ATTORNEYS

INVENTOR
Jerome L. Goldman

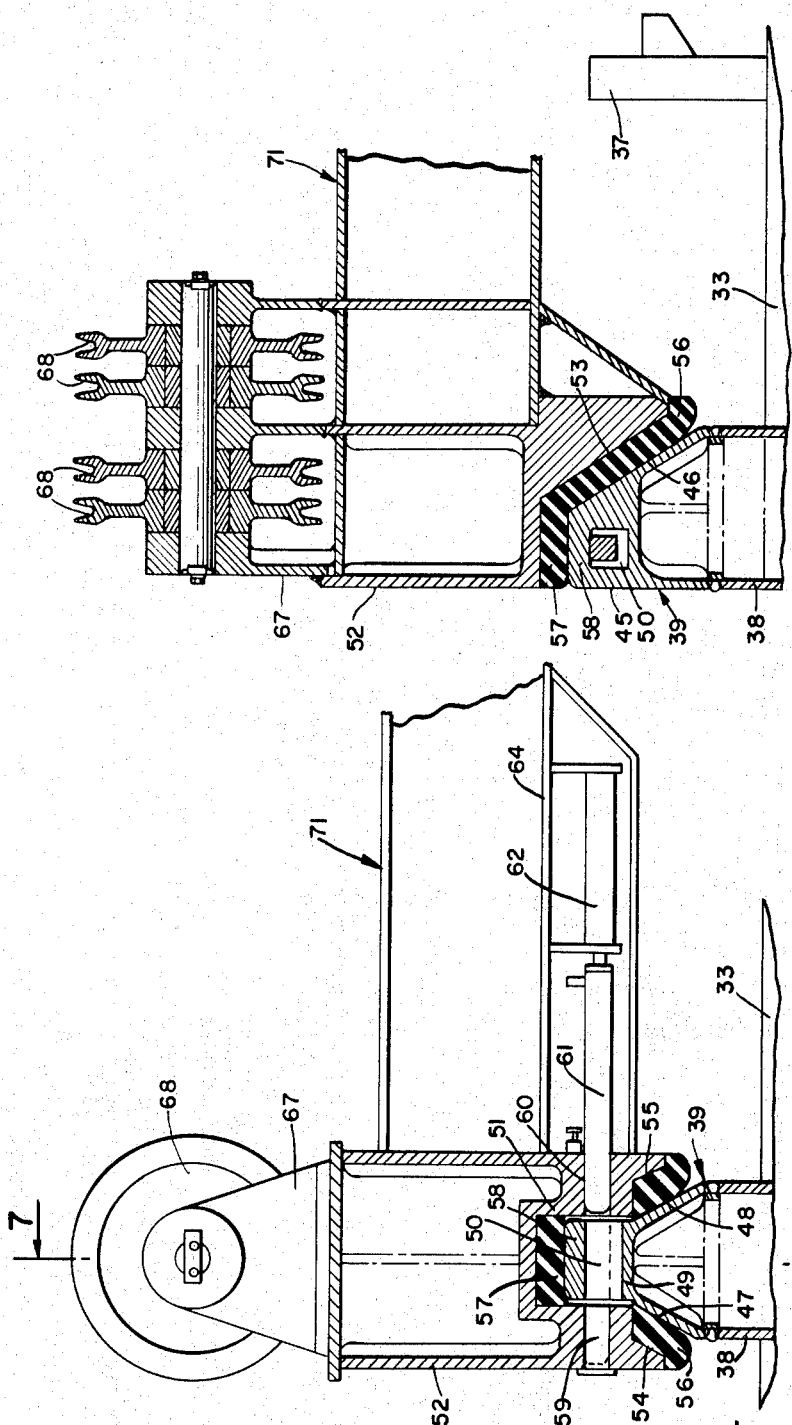

Jan. 2, 1968    J. L. GOLDMAN    3,361,274
LIGHTER LIFTING AND STACKING DEVICES
Filed April 4, 1966    6 Sheets-Sheet 5

INVENTOR
Jerome L. Goldman

BY Wilkinson, Mawhinney & Thibault
ATTORNEYS

INVENTOR
Jerome L. Goldman

United States Patent Office 3,361,274
Patented Jan. 2, 1968

3,361,274
LIGHTER LIFTING AND STACKING DEVICES
Jerome L. Goldman, 5724 Bancroft Drive,
New Orleans, La. 70122
Filed Apr. 4, 1966, Ser. No. 539,762
9 Claims. (Cl. 214—15)

ABSTRACT OF THE DISCLOSURE

The present invention is directed to lighter carrying transport ships and is directed to a quick pick up and release device to permit the ship's crane lifting unit to quickly and securely engage the lighter under floatation subject to wave motion and to lift it onto or discharge it from the ship. The device of the present invention is self centering and shock absorbing.

---

The present invention relates to lighter lifting and stacking devices.

In my U.S. Patent No. 3,273,527, granted Sept. 20, 1966, entitled "Integrated Barge and Cargo Ship Construction," I describe a new type cargo vessel carrying a large number of pre-loaded lighters (barges). The economic and operating advantages of such novel system are related in the aforementioned application.

The present invention has for its object certain new developments of major components to make the lighter carrying system safer, faster, more economical, and extend the capability of on-loading and off-loading lighters to working in disturbed seas as well as in quiet waters.

In carrying out these general objects, the invention involves means for centering the barges to a lifting frame to which they are interlocked for lifting from the water on shipboard and reversely for lifting from the hold and returning to the water, in certain improvements in block and tackle arranged on a crane and lifting frame for not only lifting and lowering the frame with interlocked lighters, but also for automatically taking up slack in the tackle or cables incident to the riding of the lighter up and down on wave forms and following troughs.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 6 is a fragmentary view taken on a magnified scale through a corner section of the lifting frame and a lighter projection shown as occupying a frame socket, the parts in position preparatory to locking, this view taken substantially on the line 6—6 of FIGURE 4.

FIGURE 7 is a vertical sectional view taken on the line 7—7 of FIGURE 6.

Figure 1:
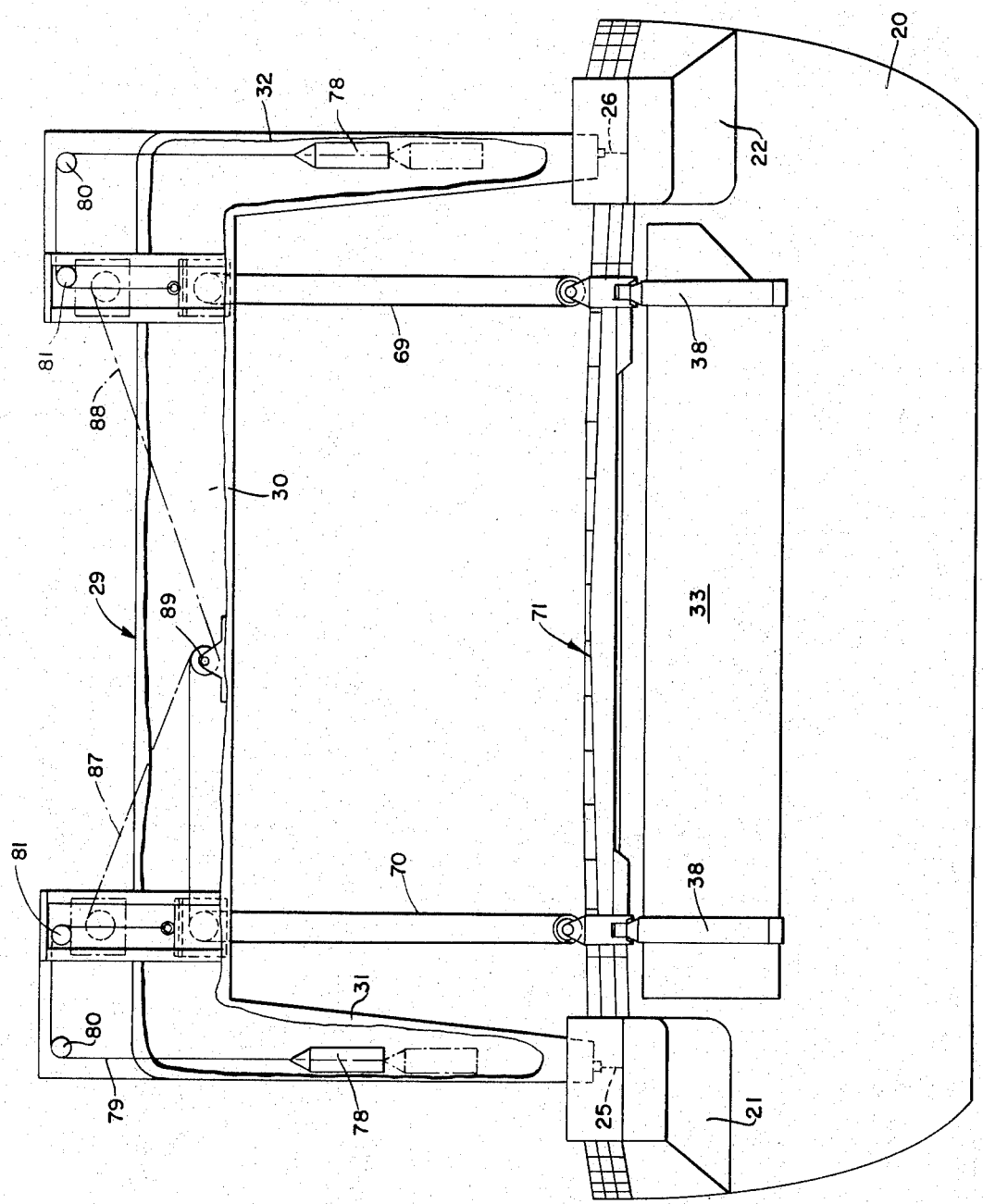
FIGURE 1 is a stern elevational view of the mother ship showing the gantry crane and lift frame with a lighter in suspended position according to the invention.
Figure 2:
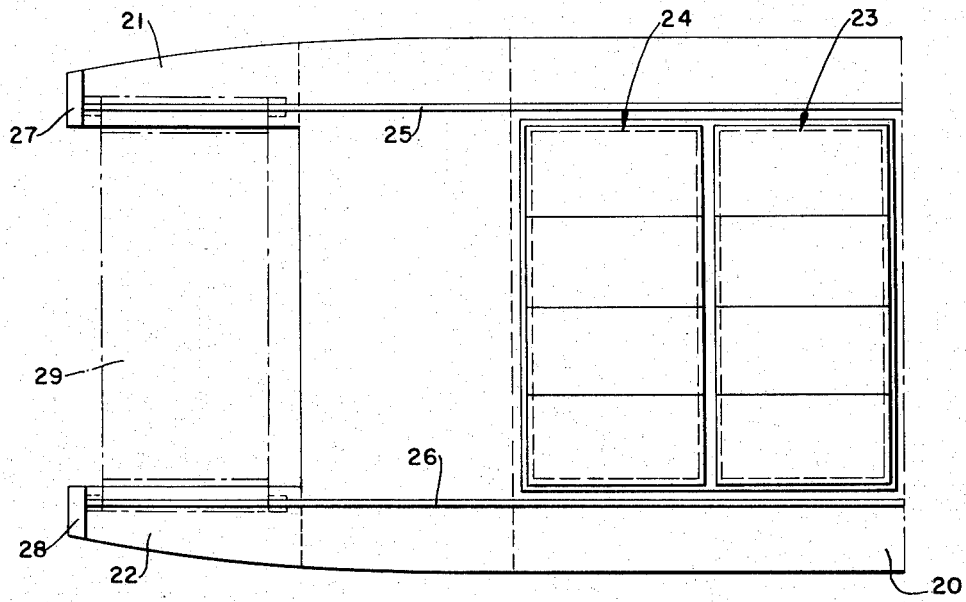
FIGURE 2 is a partial top plan view of the mother ship showing the extension stern construction and two of the holds illustrating a proposed plan of lighter stowage.
Figure 3:
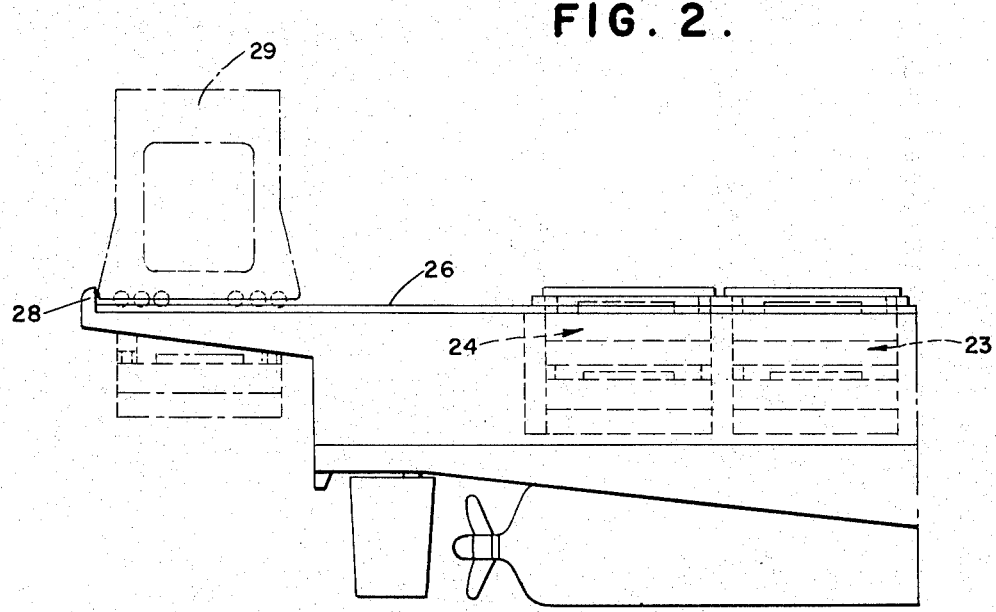
FIGURE 3 is a side elevational view of the stern section as illustrated in FIGURE 2.

Referring more particularly to the drawings, 20 designates a mother ship having stern extension beams 21 and 22 defining an area in which the lighters are lifted and lowered. The ship contains holds 23 and 24 for lighter stowage and rail tracks 25, 26 extending generally fore and aft and running out on the beams 21 and 22 to abutments 27 and 28.

A gantry crane 29 is movable on the tracks back and forth between positions spanning the stern beams 21, 22 and the lighter stowage holds 23 and 24.

The gantry crane may be of any conventional form, for instance, having hollow overhead beams 30 and hollow legs 31 and 32.

The lighters involved will or can be of standard construction modified, as shown in FIGURES 8 to 12 inclusive, wherein such lighters are designated generally as at 33 having a stern end 34 and a bow end 35 with an inclined section 36. At 37 is a coaming upstanding from the deck defining the opening to the internal cargo hold.

The modification is involved with four corner posts 38 which, as indicated more particularly in FIGURES 6 and 7, may be in the form of hollow steel columns welded or otherwise incorporated in the structure of the lighter. To the top of each post is welded or otherwise affixed a cap piece 39 and to the lower end of the post 38 is welded or otherwise affixed a base member or casting 40 of the form more particularly shown in FIGURE 11 having preferably an upstanding internal or central strengthening web 41.

Figure 12:
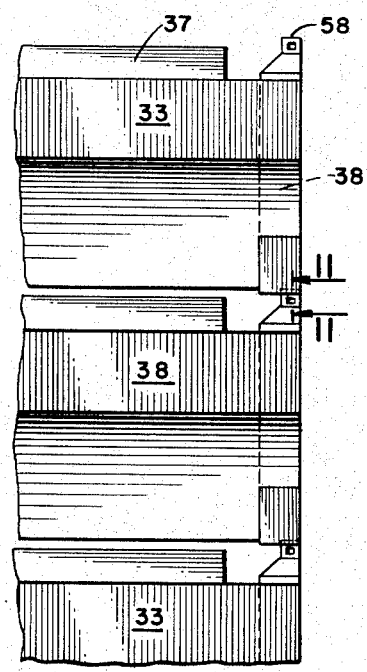
FIGURE 12 is a fragmentary front elevational view showing how three-high lighters may be stacked against casual relative displacement in a hold of the ship utilizing the top projections of the posts fitting in bottom recesses in the post base castings.
Figure 10:
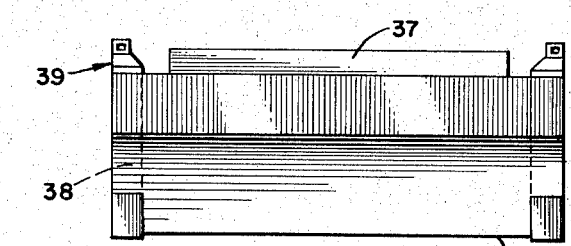
FIGURE 10 is a front end elevational view of the lighter equipped according to the invention.
Figure 11:
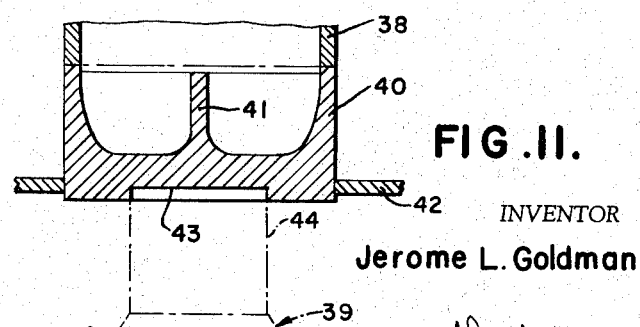
FIGURE 11 is a fragmentary vertical sectional view through a portion of the bottom section of a lighter illustrating a form of base casting for the tubular or other forms of posts carrying the projections which detachably interfit with the sockets of the lifting frame, such view being taken on the line 11—11 of FIGURE 12.
Figure 13:
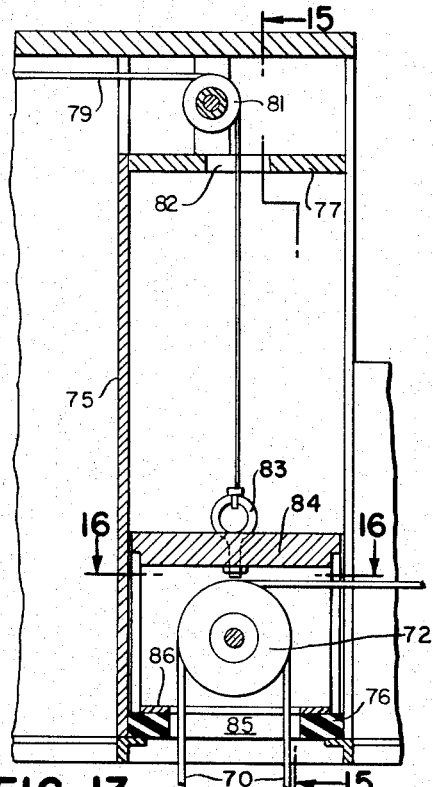
FIGURE 13 is a fragmentary vertical sectional view through the overhead structure of the crane and through one of four guide towers mounted in the crane structure in which upper sheave blocks are vertically slidable to maintain the tackle taut at all times, and illustrating a sliding sheave block in lowermost position.

These base members 40 extend through the bottom planking 42 of the lighter and the under-exposed bottom portions of the base members 40 are recessed as indicated at 43, the recesses opening downwardly in order to receive the upper narrower portions 44 of the cap pieces 39 when the lighters are stacked in the holds of the ship, one upon another as indicated in FIGURE 12.

The cap pieces 39 or upward projections are preferably formed as shown in FIGURES 6 and 7, in which outer faces 45 are substantially vertical while the other three walls 46, 47 and 48 converge upwardly from the upper end of the posts 38. The innermost wall 46, as shown in FIGURE 7, may slope continuously up to the upper end of the projection while the two lateral walls 47 and 48, as shown in FIGURE 6, converge only to the lower end of a septum 49 which forms the base of a lateral or horizontal opening 50 through the upper narrower section of the projection which is preferably of a generally rectangular or square shape and which fits into the upper portion of a socket 51 formed in corner structures 52 of which there are four mounted in the four corners of a lifting frame.

The lower portion of the socket is defined by the inner sloping wall 53 (FIGURE 7) and the downwardly flaring walls 54 and 55 (FIGURE 6). The socket is preferably lined with shock absorbing material 56 including a head section 57 which takes the thrust of the upper rectangular end of the post section 58.

The opening 50 is preferably square, as indicated in FIGURE 7, and in the home position of the projection (FIGURE 6) this opening 50 is adapted to aline with similar openings 59 and 60 formed in alinement in the corner structure and receiving therethrough a locking pin 61 which is shown in FIGURE 6 in the retracted position but which is adapted to be projected through the alining and registering openings 50, 59 and 60 for interlocking the lighter with the lifter frame.

Figure 4:
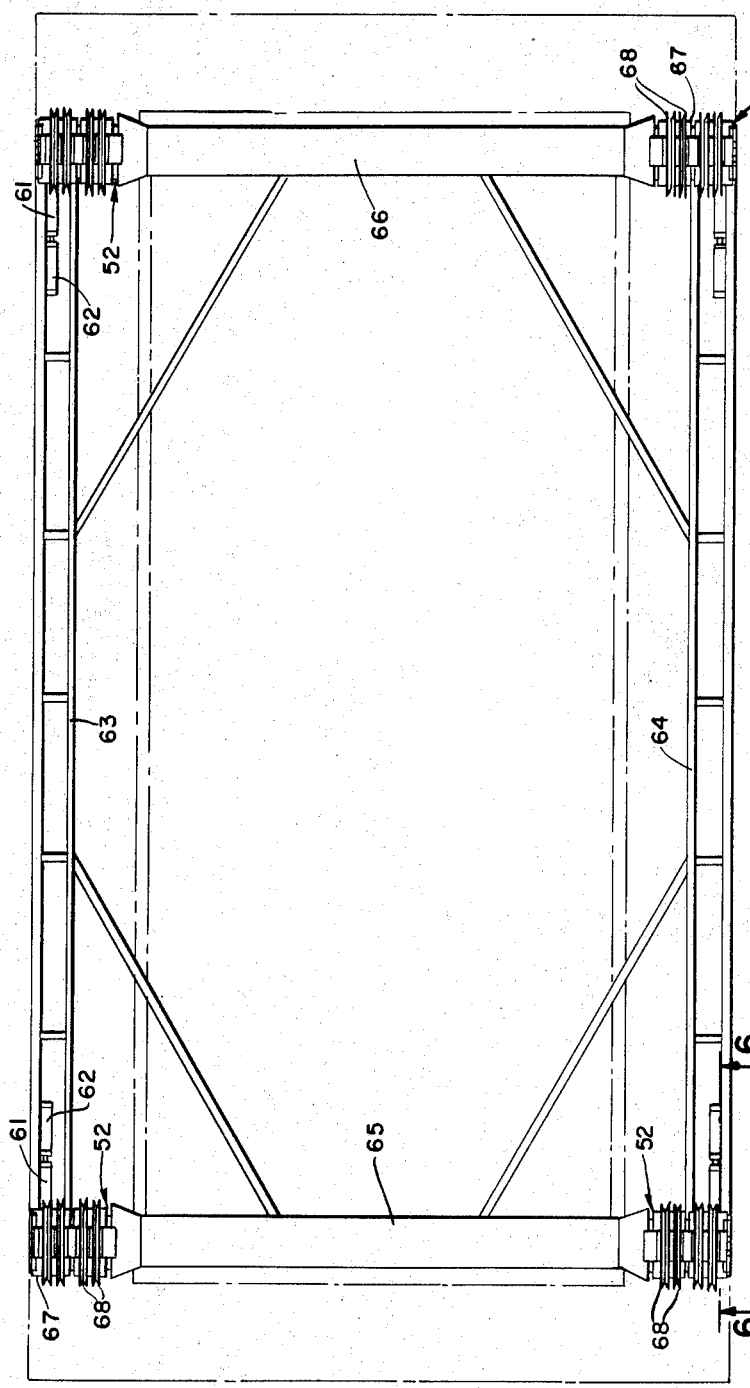
FIGURE 4 is a top plan view of a form of lifting frame employed.
Figure 5:
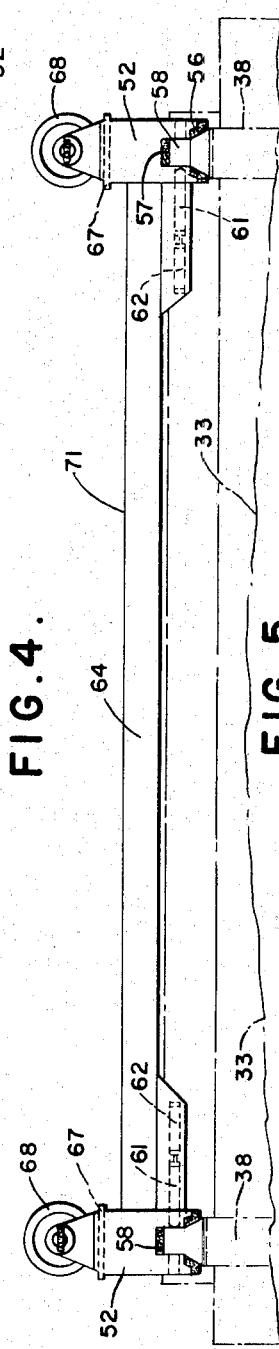
FIGURE 5 is a side elevational view of the same, showing in dotted lines a lighter as attached to the frame.
Figure 8:
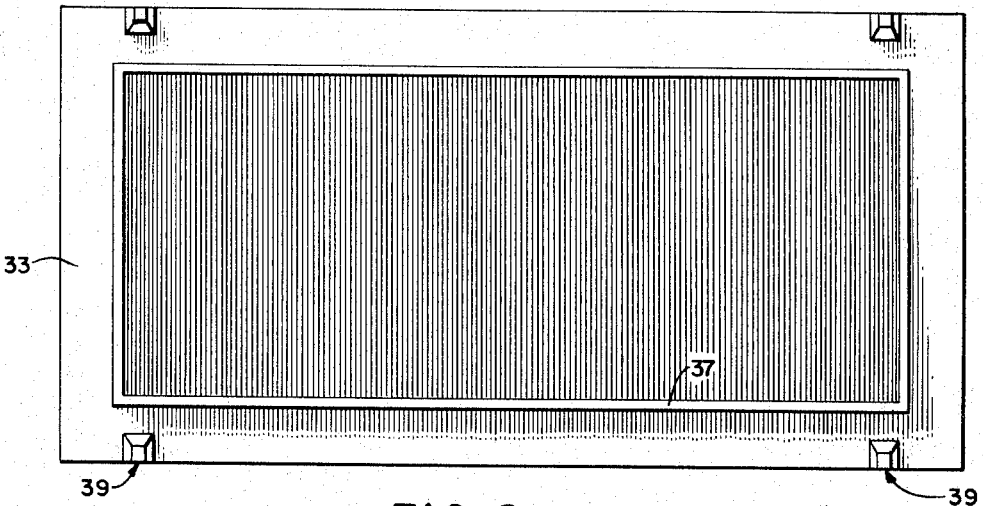
FIGURE 8 is a top plan view of a form of lighter employed.
Figure 9:
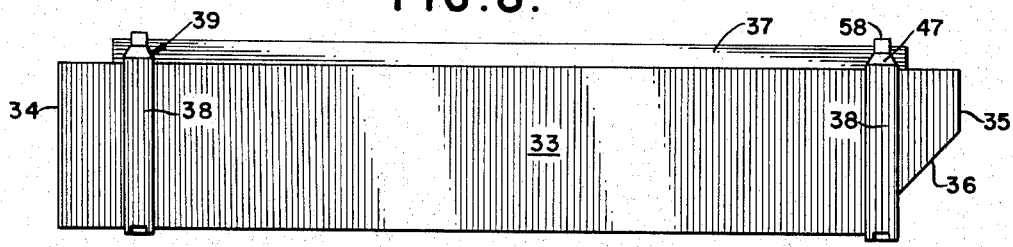
FIGURE 9 is a side elevational view of the same.

A pneumatic, hydraulic solenoid or other motor 62 is adapted to project and retract the various locking pins 61 in the four corners of the lifting frame, shown more particularly in FIGURES 4 and 5.

This lifting frame may be of a generally rectangular construction which may consist of side beams 63 and 64 and end beams 65 and 66, suitably braced, and embodying the corner structures 52 heretofore described in connection with FIGURES 6 and 7.

Affixed to these corner structures are the sheave blocks 67 containing the sheaves 68.

The lifting frame is freely suspended from fore and aft flexible cables or tackle 69 and 70, as shown in FIGURE 1, so that the lifting frame 71 is suspended at four points in line with the detachable connections to the lighters 33.

As shown more particularly in FIGURES 1 and 13 to 16, inclusive, the tackle 69, 70 is supported at its upper ends in sheave blocks 72 which are likewise four in number and mounted in the upper beams of the crane structure 29.

As shown in FIGURES 13 to 16 inclusive, the upper sheave blocks 72 are slidably mounted on runners 73 and 74 in vertically elongated elevator shafts 75, which shafts are mounted in the upper portion of the crane. At the lower ends of these shafts are resilient or other stop bumpers 76 and at the upper ends limit stop partitions 77.

Figure 14:
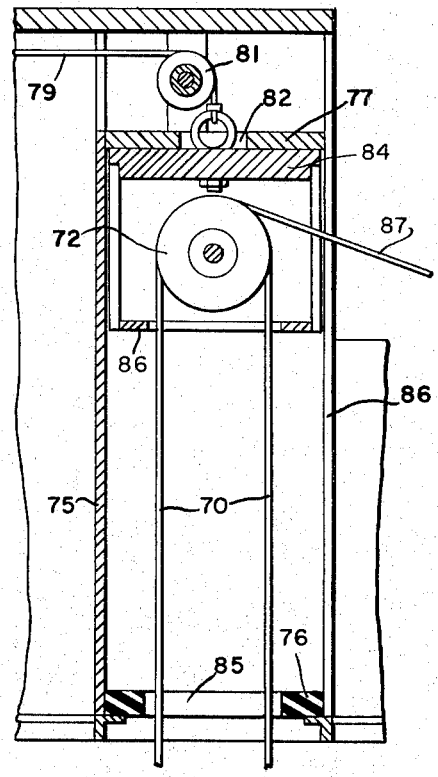
FIGURE 14 is a similar view showing the sheave block at the upper limit of its movement.
Figure 15:
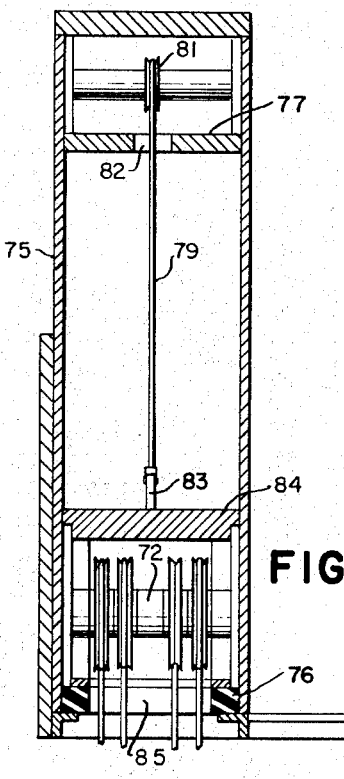
FIGURE 15 is a vertical sectional view taken on the line 15—15 in FIGURE 13.
Figure 16:
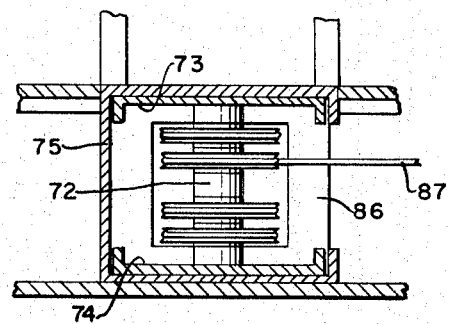
FIGURE 16 is a horizontal sectional view taken on the line 16—16 in FIGURE 13.

The sheave blocks 72 are biased to the upper position of FIGURE 14 by any suitable means, for instance, the counterweights 78 which move freely up and down in the legs 31, 32 of the crane structure and which are attached to cables 79 running over pulleys 80 and 81, from the latter of which the cables 79 are directed downwardly through openings 82 in the upper stop members 77, the cables being affixed to rings or other attaching devices 83 in the top members 84 of the sliding sheave blocks 72. The stop bumpers 76 at the lower ends of the shafts 75 have openings 85 to permit free play of the cables 70.

The inner sides of the shafts are open, as indicated at 86, to permit cable branches 87 and 88 (FIGURE 1) to extend to a winch or drum 89 driven by an appropriate motor under the control of the operator of the gantry crane for raising and lowering the lifting frames 71 and entrained lighters 33 when such lighters are picked up either from the water or from stowage in the holds of the mother vessel.

The mode of operation is substantially as follows:

A tug delivers a lighter to the stern of the ship. Temporary lines (ropes) are dropped from above by remote control, which enables one man at the stern, by means of powered winches to which these lines are led, to maneuver the lighter snugly against the ship and center the lighter in the desired position relative to the ship's centerline. This can be done under the present state of the art.

The lighter-handling crane is then positioned directly over the lighter, and the crane operator lowers the lifting frame 71 onto the lighter's four projections. The tapered tops of the projections, along with the similar tapered walls of the sockets at the lifting frame corners provide a self-centering effect, guiding the lifting frame snugly onto the lighter upstanding projections. High impact loadings are avoided by the shock absorbing material 56, 57 forming linings in contact areas.

When the frame is seated firmly on the four projections of the lighter, a sensing device may relay to the crane operator that such firm positioning has been achieved. This effect can be had by electrical or mechanical devices at present in common use. Only when all four sensing devices report full seating of the lifting frame will the next step be possible, namely, electric or other interlocking of the frame to the lighter by the locking pins. The operator may be informed by visual signals of the satisfactory completion of each of the foregoing steps; whereupon, and only then, can the operator move the control for putting in action the raising effort of the crane.

While the on-and-off loading of lighters will mainly occur in protected waters, relative motion between the lighter and the ship can occur with the lighter afloat. For example, this can be caused by waves formed by passing vessels, by storm winds in bays or wide rivers. Further, on occasion, the operator may find it to advantage to perform these operations in open waters with a moderate swell running. To make this possible the crane has means for keeping the lifting cables under tension at all times, as heretofore described.

The lighter is then by usual controls applied to the winch 89, lifted fully up into the crane and the crane rolls forward to the desired location of lighter deposition. The crane operator lines up the crane directly over the stowage location and proceeds to lower the lighter into the selected cell. The lighters are stacked as shown in FIGURE 12.

Appropriate guides in the holds will keep the lighters in place when the vessel rolls and pitches while at sea. When a hold is full, the hatch cover is closed and further lighters may be set upon the hatch covers as deck cargo.

The stern beams in effect constitute an outrigger construction which may be reinforced by suitable braces.

The three-sided sockets have one outer side open for easier initial assembly of the lifting frame to the lighter. While conceivably the sockets may be on the lighters and the projections on the lifting frame, there is an added advantage with the sockets on the frame opening downwardly to be self-draining of sea water, flotsam or foreign matter.

The design of the various parts provide a simple, rugged and economical arrangement for the lifting of the lighters and the stacking of the lighters, one upon another, when placed in the hold of a ship. The arrangement for connecting the lighters to the lifting frame by means of power actuated steel pins permits simple and massive structure providing easy operation and great strength.

The lifting frame with the locking pins and associated structures are enabled to pick up lighters weighing in excess of five hundred tons, the same being done with both speed and safety.

The lifting system recognizes the handling process may take place in other than perfectly calm water. Furthermore, the counter-balanced upper sheave block assembly enables the lighter to move relative to the ship during the critical stage when none or little of the weight of the lighter has yet been taken up by the crane. The counterbalances act to support part of the weight of the lifting frame and the upper sheave blocks.

Thus, it can be seen that once the lifting frame rests upon the lighter, the pair can oscillate vertically in combination and this can go on endlessly without the lifting cables becoming slack. Further, it does not matter whether the locking pins are, or are not, engaged. At his discretion, the operator engages the locking pins; he is then free to lift the lighter and at no time will experience the slack cable problem referred to herein.

Although I have disclosed herein the best forms of the invention known to me at this time, I reserve the right to all such modifications and changes as may come within the scope of the following claims.

What is claimed is:

1. In combination, a lighter unit under floatation subject to wave motion, a transport ship adapted to receive and transport a plurality of lighters, a crane lifting unit on said ship being movable up and down for lifting and lowering the lighter onto and off of said ship, projections upstanding from said lighter, complemental sockets on said crane lifting unit to receive the projections on said lighter when the units are brought into juxtaposition, said projections and sockets being so relatively shaped to cause centering of the lighter projections and the crane lifting unit as they are moved together and the lighter projections enter progressively into the sockets of the crane lifting unit, and releasable retaining means carried by said crane lifting unit for retaining said crane lifting unit and said lighter in coupled relationship during transfer of said lighter onto and off of said transport ship.

2. The combination of claim 1 in which the projections and sockets have
   mutually inclined walls with the walls of the sockets flaring to open mouths, and walls of the projections tapering to free end portions which lead in first entering the wider mouths of the sockets.

3. The combination of claim 2, further comprising corner structures embodied in the lifting units in which said sockets are made,
   said sockets being open at one side,
   said projections being on the lighter units and having substantially vertical side walls at the open sides of the sockets mating with adjacent side walls of the corner structures.

4. The combination of claim 1, further comprising shock absorbing material fitted between the projections and sockets.

5. The combination of claim 1, further comprising means for interlocking the projections when driven home in the sockets to the substantially full centered position whereby
   the lighter units will be entrained with the lifting unit for causing raising of the lighters out of the water and out of the stowage holds.

6. The combination of claim 1, further comprising corner structures embodied in the lifting unit in which the sockets are formed with
   inclined walls flaring downwardly to open mouths of the sockets,
   said projections upstanding from corner portions of the lighter units and having
   reduced upper free ends and walls flaring downwardly therefrom to enter the sockets when the lifting unit is lowered whereby to center the lighter unit with reference to the lifting unit.

7. The combination of claim 6 in which the upper free ends of the projections have
   lateral through openings, said socket walls having
   alining openings with which the projection openings register when the projections are moved home into the sockets, and
   locking pins in the lifting unit movable into said registering openings for assuming the thrust developed when the lifting units lifts the lighter unit out of the water and out of stowage holds.

8. The combination of claim 7 in which said registering openings and said locking pins are
   substantially rectangular in cross section, and
   means for projecting and retracting the locking pins into and out of said registering openings.

9. The combination of claim 1 in which
   posts carrying the projections are incorporated in the structure of the lighter units,
   base members for said posts having recesses opening through the bottom portions of the base members to receive the projections of underlying lighter units in the stacked disposition of the lighter units in the hold of the ship.

References Cited

UNITED STATES PATENTS

| | | | |
|---|---|---|---|
| 1,084,630 | 1/1914 | Hawthorn. | |
| 1,639,788 | 8/1927 | Uline | 294—81 |
| 1,926,432 | 9/1933 | Butts et al. | 220—1.5 |
| 2,440,307 | 4/1948 | Smith | 114—72 |
| 2,457,842 | 1/1949 | Smith et al. | 220—1.5 |
| 2,547,502 | 4/1951 | Smith et al. | 294—67.4 |
| 3,206,243 | 9/1965 | Miles | 294—81 |
| 3,262,729 | 7/1966 | Willison et al. | 294—81 |

RICHARD E. AEGERTER, *Primary Examiner.*

EVON C. BLUNK, *Examiner.*

M. L. AJEMAN, *Assistant Examiner.*